United States Patent
Xiao et al.

(10) Patent No.: US 10,445,334 B1
(45) Date of Patent: Oct. 15, 2019

(54) QUERY TRANSMISSION IN TYPE-LIMITED INTERCHANGE FORMATS

(71) Applicant: Amazon Technologies, Inc., Seattle, WA (US)

(72) Inventors: Wei Xiao, Bellevue, WA (US); Fahad Ahmed, Santa Clara, CA (US); Andrew Desmond Budiman, Sunnyvale, CA (US); Usman Ahmed Shami, Sammamish, WA (US); Fehmi Dogus Ertemur, Newark, CA (US); Jeffrey Hocheng Nieh, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 988 days.

(21) Appl. No.: 14/852,325

(22) Filed: Sep. 11, 2015

(51) Int. Cl.
    *G06F 16/25* (2019.01)
    *G06F 16/245* (2019.01)
    *G06F 16/951* (2019.01)
    *G06F 16/22* (2019.01)

(52) U.S. Cl.
    CPC ........ *G06F 16/252* (2019.01); *G06F 16/2246* (2019.01); *G06F 16/245* (2019.01); *G06F 16/258* (2019.01); *G06F 16/951* (2019.01)

(58) Field of Classification Search
    None
    See application file for complete search history.

(56) References Cited

U.S. PATENT DOCUMENTS

2010/0011013 A1\* 1/2010 Singh ............... G06F 17/30327 707/E17.006

OTHER PUBLICATIONS

"SQL as Understood by SQLite"; SQLite; http://sglite.org/lang_expr.html; accessed Sep. 21, 2015; 11 pages.
Root; "String Literals in Perl"; PerlMonks; http://www.perlmonks.org/?node=String%20Literal%20in%20Perl; Nov. 1999; accessed Sep. 21, 2015; 4 pages.
"Strings"; PHP:Strings—Manual; http://www.php.net/manual/en/language.types.string.php; © 2001-2015; accessed Sep. 21, 2015; 21 pages.
"String Interpolation"; Wikipedia; https://en.wikipedia.org/wiki/String_interpolation; accessed Sep. 21, 2015; 8 pages.
"Number Sign"; Wikipedia; https://en.wikipedia.org/wiki/Number_sign#In_computing; accessed Sep. 21, 2015; 5 pages.
"Colon (punctuation)"; Wikipedia; https://en.wikipedia.org/wiki/Colon_%28punctuation%29#Computing; accessed Sep. 21, 2015; 10 pages.

(Continued)

*Primary Examiner* — Amresh Singh
(74) *Attorney, Agent, or Firm* — Davis Wright Tremaine LLP

(57) ABSTRACT

A client application may interact with a database service using a data interchange format with limited support for database data types or query representations. A map may be supported in the interchange format as a collection of name-value pairs. A database query may be parsed to form an abstract syntax tree. From the abstract syntax tree, a hierarchy of nested maps may be formed to represent the query, based on schemas mapping from regions of the abstract syntax tree to maps in the interchange format.

20 Claims, 10 Drawing Sheets

(56) References Cited

OTHER PUBLICATIONS

"Inserting records into Sqlite using Python parameter substitution where some fields are blank"; Stack Over Flow; http://stackoverflow.com/questions/3148315/inserting-records-into- sqlite-using-python-parameter-substitution-where-some-fie; 2015; accessed Sep. 21, 2015; 4 pages.

"5.1.4 Working with Parameters"; MySQL; http://dev.mysql.com/doc/connector-net/en/connector-net-tutorials-parameters.html; 2015; accessed Sep. 21, 2015; 3 pages.

* cited by examiner

QUERY TRANSMISSION IN TYPE-LIMITED INTERCHANGE FORMATS

BACKGROUND

Web-based applications may utilize data interchange formats to communicate with remote services. In some cases, an interchange format may be designed with an emphasis on simplifying development for a wide range of applications, rather than on providing targeted support for certain specialized fields. This allows the interchange format to be compact and easily parsed. However, because interchange formats do not have extensive type support, they may not be readily adaptable to some database applications.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
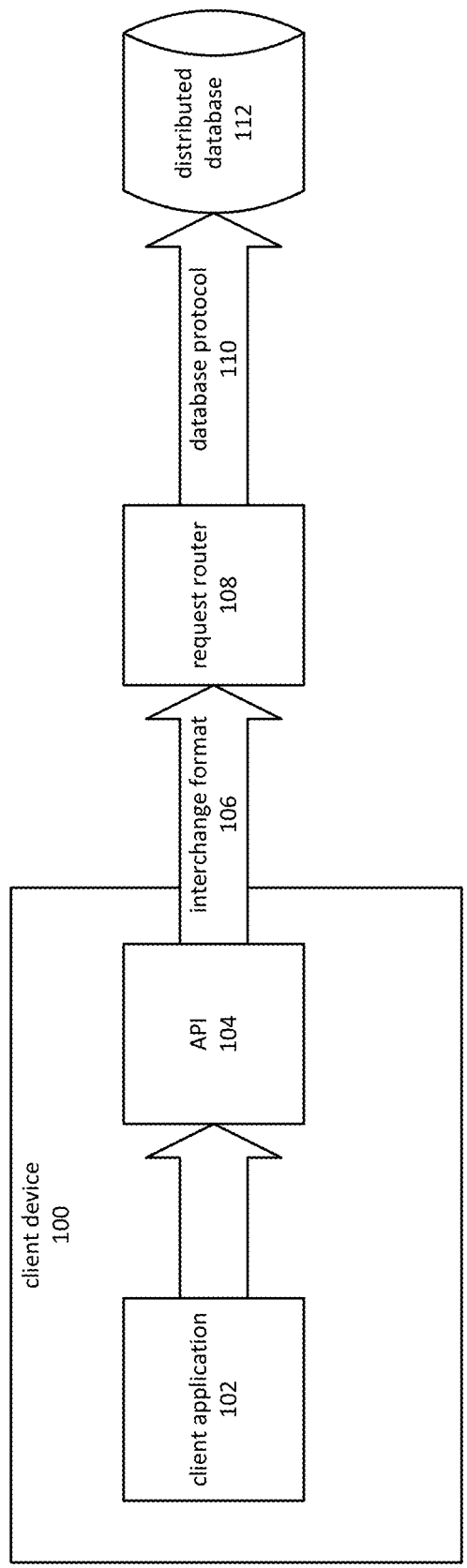
FIG. 1 is a block diagram depicting transmission of a database query in an interchange format with limited data type support.

Disclosed herein are systems, methods, and computer program products for transmitting database queries to a database service via a type-limited interchange format. An interchange format may refer to a protocol or standard for interaction between components of a distributed system. Interchange formats such as Extensible Markup Language ("XML") and JavaScript Object Notation ("JSON") may be both human-readable and to facilitate processing by computer. However, interchange formats such as XML and JSON may have limited built-in support for the data types typically used in database systems. This may be particularly problematic in interchange formats, such as JSON, which may not be designed for extensibility. Similar issues may exist with respect to the sometimes complex structure of database queries, which may be problematic to encode without the loss of fidelity in an interchange format.

In an example, a database service may receive and process database queries provided to it in an interchange format. The service may be a hosted database service, in which a provider hosts various services that store and retrieve data on behalf of a customer. The storage and retrieval services are typically provided over a public network, such as the Internet. The customer may provide its own clients with the means of accessing the service through a client application. In some instances, the client application may be provided as a web page or through a web server. Interchange formats such as JSON may be used for communication between the client application, such as the web page, and the database service.

The client application may utilize an application programming interface ("API") supplied by the provider of the database service to facilitate communication in the interchange format. The client application may, in the course of its operation, formulate various database queries. The application may, in some instances, formulate the database queries in a textual form, or through the use of the API. In either case, an abstract syntax tree that is representative of the query may be formulated by the API.

The API may use the abstract syntax tree to formulate a representation of the query that is based on a map structure of the interchange format. The interchange format may have associative arrays or other similar constructs that allow for the representation of nested collections of name-value pairs. JSON, for example, includes an object type that comprises an unordered collection of name-value pairs, where the values in the name-value pairs may themselves be maps.

The query may be forms as a map in the interchange format by associating a region of the abstract syntax tree with corresponding schemas. A schema may define a format for a nested map, in the format of the interchange format, which represents a region of the abstract syntax tree. The abstract syntax tree may, within the applicable region, contain nodes that define various elements of the query, such as the identifiers, operators, comparisons, and values referenced in the query. After matching a region of the abstract syntax tree with a schema, the API may extract data from the relevant portions of the abstract syntax tree and formulate a nested map object that is consistent with the schema. By appropriate nesting of the maps, the API can construct a map-based representation of the query.

The map-based representation of the query can be transmitted, as a document of the interchange format, to the database service. At the database service, the representation of the query can be reconstituted into a format that the database can execute. When the query is executed, the results of the execution of the query can be returned to the client application in a manner that is compatible with the interchange format.

FIG. 1 is a block diagram depicting transmission of a database query in an interchange format with limited data type support. A client device may be any of various types of computing devices configured to execute a client application 102 that formulates a database query and uses application programming interface ("API") 104 to transmit the query, in an interchange format 106, to a service that provides data storage and retrieval. The service may comprise a request router 108 that receives the query represented in the interchange format 106 and forwards it to a distributed database 112 for processing, after converting the representation of the query from one in interchange format 106 to a representation of the query in database protocol 110.

The client application 102 may be an executing application at least partially loaded into the memory of the client device 100. The API 104 may be a dynamic link library or other code module at least partially loaded into the memory of the client device 100. The API 104 may be included in the code of client application 102, or loaded into memory independently of the client application 102.

The client application 102 may, in the course of its operation, formulate database queries for execution on a remotely accessed service for storing and retrieving data. As noted, this service may comprise the request router 108 and the distributed database 112.

The database queries formulated by client application 102 may initially be in a textual format and/or binary format compatible with the expectations of the distributed database 112. This may, for example, comprise formulating a structured query language ("SQL") query if the distributed database 112 supports queries provided to it in the SQL language. If the distributed database 112 is a non-relational or "NoSQL" database, the queries formulated by client application 102 may comprise textual expressions compatible with a NoSQL database.

The interchange format 106 may be a general-purpose format for exchanging data between computing systems. Non-limiting examples include XML and JSON. These formats may be designed to be human-readable while at the same time able to facilitate computerized processing. While XML is a general-purpose interchange format, JSON is generally, although not exclusive, directed to scenarios involving communication between a browser application operation on a client device and a web server. The XML and JSON formats generally provide support for a limit number of in-built data types. JSON, for example, provides support for integers, floating point numbers, strings, Booleans, arrays, and objects. In JSON, objects are represented as unordered collections of name value pairs, and may be described as maps because they act as associative arrays.

The API 104 converts the query supplied by client application 102 to the interchange format 106. There may, however, be representational dissimilarities between the query in its native format, as formed by the client application 102, and the representational capabilities of the interchange format 106. For example, the interchange format 106 may be type-limited compared to the representation of the query as formed by the client application 102. In other words, the query may be written to reference data types not supported by the interchange format 106. There may also be structural dissimilarities between the query and the interchange format 106.

The API 104 may convert the query to the interchange format 106 using a map type of the interchange format. For example, within a JSON document the object data type may consist of an unordered collection of name-value pairs, and may therefore act as an associative array or, in other words, a map. A value of the name-value pairs may be another object, which may also represent a map. The API 104 may use nested maps, which may also be described as hierarchies of maps, to represent the various data types and structures of the query language.

Figure 2:
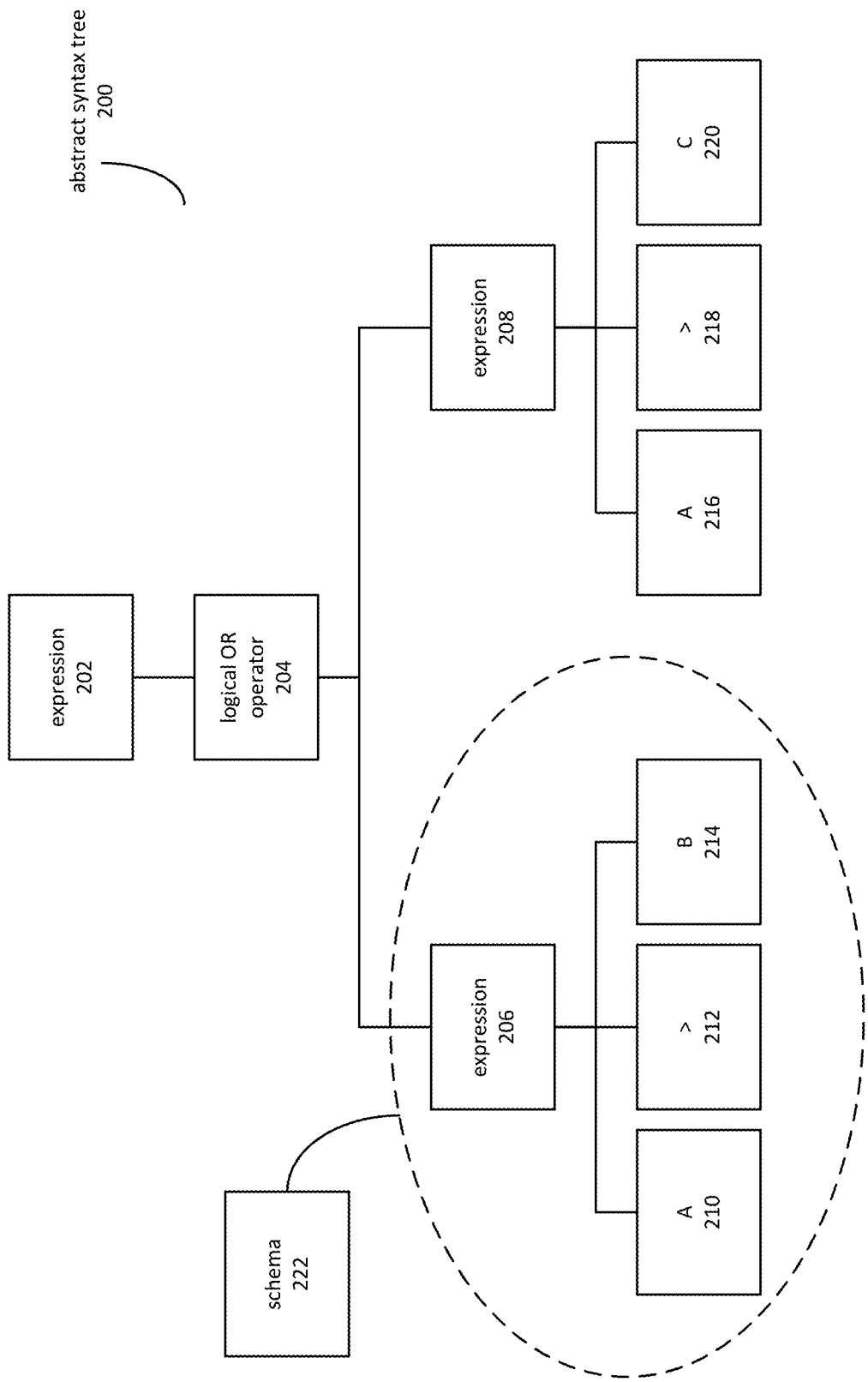
FIG. 2 is a block diagram depicting an example of a schema corresponding to a region of an abstract syntax tree.

The API 104 may parse the query as an initial stage of converting the query to the interchange format 104. In synchrony with the parsing, or subsequent to it, the API 104 may form an abstract syntax tree. The API 104 may then identify a region of the abstract syntax tree that corresponds to a schema of a map that may be formed in the document interchange format 106. FIG. 2 is a block diagram depicting an example of a schema corresponding to a region of an abstract syntax tree 200. The abstract syntax tree 200 may represent all of or a portion of a query formulated by the client device 100. As may be seen in FIG. 2, the abstract syntax tree 200 may comprise a hierarchy of nodes 202-220 that each represents some element, or combination of elements of a query. The abstract syntax tree 200 may also include parse trees, syntax tree, or other similar structures that may be obtained from parsing and, in some cases, lexical or contextual analysis.

The example of an abstract syntax tree that is depicted in FIG. 2 is provided for illustrative purposes, and should not be viewed as limiting the scope of the present disclosure. In the example of FIG. 2, an expression 202 is the root of the abstract syntax tree 200, and corresponds in textual form to "A>B OR A>C."

The API 104 may analyze the abstract syntax tree 200 to identify regions of the abstract syntax tree 200 that correspond to a schema of a map object of the interchange format. The schema 222 defines a structure for the map object in the interchange format, and may also include information allowing the API 104 to relate elements of the region of the abstract syntax to the schema 222, and thereby construct a map that corresponds to the region. The schema may be identified by the API 104 based on various factors, including annotations added to the abstract syntax tree 200 which indicate the type of node and its contextual meaning within the overall expression and/or query.

In FIG. 2, the schema 222 is depicted as applying to a region that comprises the nodes 206, 210, 212, and 214. Another schema might correspond to the nodes 208, 216, 218, and 220. The node 204 might correspond to another schema, and so on. There may be recursive and other interrelationships between the schemas. For example, the schema for the "OR" operator at node 204 might reference the two schemas that represent "A>B" and "A>C." A resulting map for the logical "OR" operator 204 might therefore include two additional maps as children, one map for "A>B" and another for "A>C."

Figure 3:
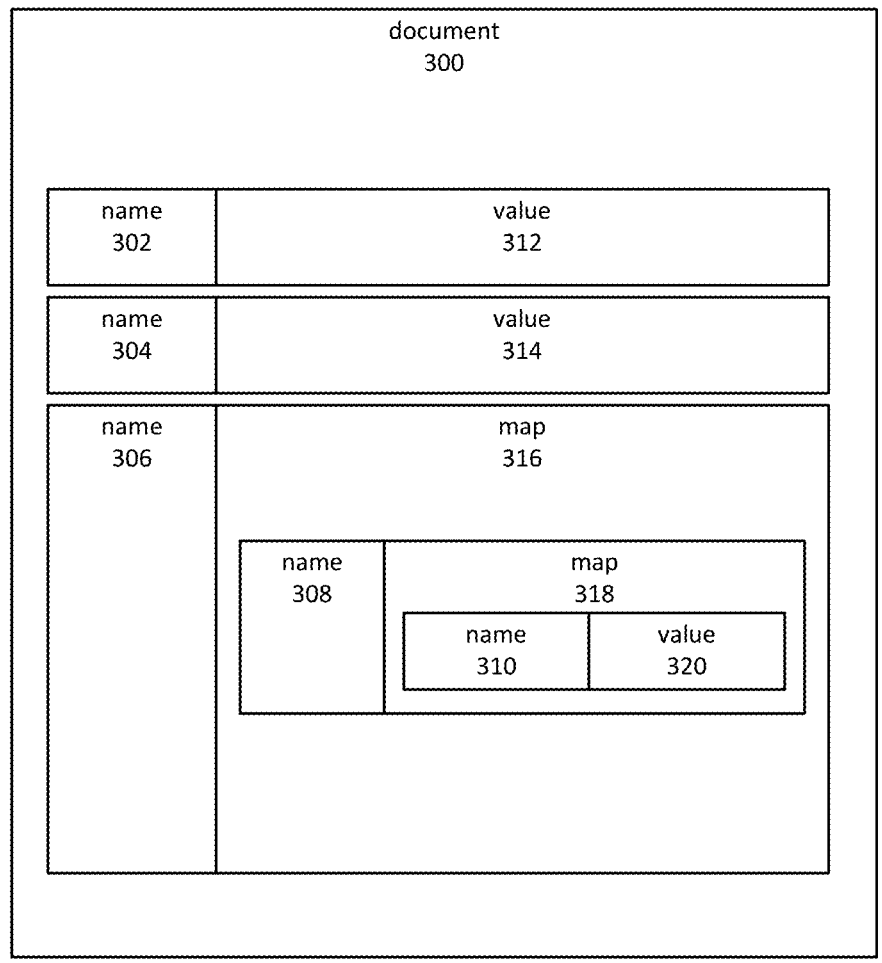
FIG. 3 depicts an example of a query represented by a document of an interchange format.

The API 104 may embed maps generated based on the schemas and the abstract schema tree into a document of the interchange format. FIG. 3 depicts an example of a query represented by a document of an interchange format. The document 300 of the interchange format may be a top-level unit of data interchange when using the interchange format. A document 300 may be encoded by the API 104 to contain a map-based representation of the query formulated by application 102.

The document 300 may consist of a collection of name-value pairs, such as the name-value pair 302, 313 and 304, 314. A name-value pair 306, 316 may include a map value 316. As may be seen in FIG. 3, the map 316 may itself comprise a collection of name-value pairs, including the depicted name-value pair 308, 318. This map 318 may also contain a collection of name-value pairs, including the depicted name-value pair 310, 320. The nested maps 316 and 318 are an example of a hierarchy of nested maps. The depicted hierarchy might be used to represent a portion of an abstract syntax tree, wherein the hierarchy of the abstract syntax tree is translated, using a schema, to a hierarchy of the nested maps.

Figure 4:
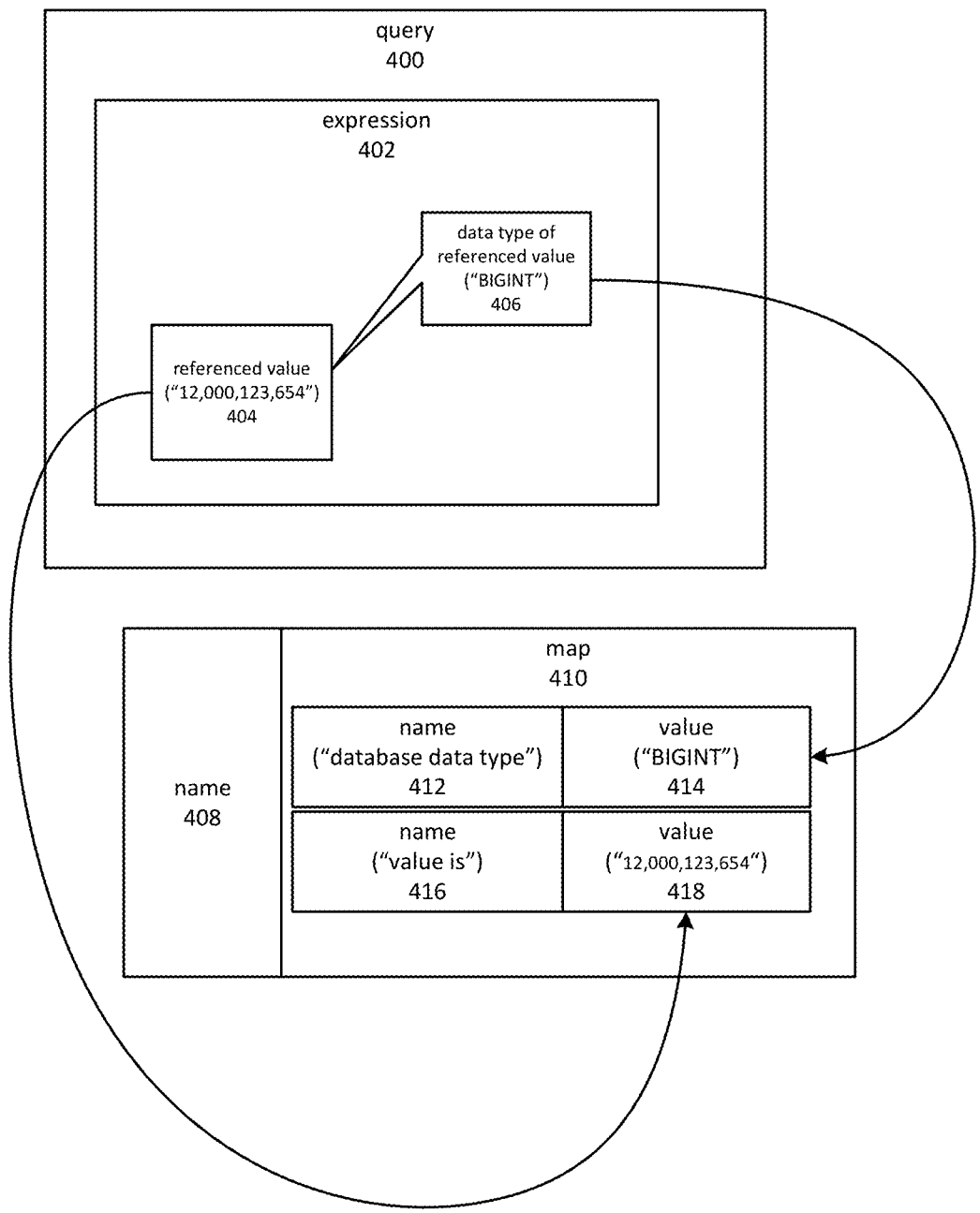
FIG. 4 is a block diagram depicting translation of a database data type referenced in a query to a hierarchy of nested maps in an interchange format.

One example of a schema-based translation involves database data types that are referenced in a query. FIG. 4 is a block diagram depicting translation of a database data type referenced in a query to a hierarchy of nested maps in an interchange format. Database queries may reference various constants or literals that are explicitly or implicitly associated with a data type defined in the database but not in the interchange format.

As depicted by the example of FIG. 4, a query 400 may comprise one or more expressions, such as the depicted expression 402. The expression 402 may represent some portion of the query, such as a statement, clause, mathematical equation, and so on. The expressions, such as the depicted expression 402, may correspond to regions of an abstract syntax tree.

The expression 402 may contain references to constants, literals, variables, and so forth that are associated with a database data type. For example, the expression 402 might correspond to a clause "SET a·b=12,000,123,6544." This expression includes a numerical value (12,000,123,654) that corresponds to a "BIGINT" data type. The reference to "a·b" also suggests association with a BIGINT data type, since it is to be set to the same numerical value.

The API 104 may recognize the referenced value 404 in the abstract syntax tree and associate it with a schema that defines a format for a map-based encoding of the data type. The schema may correspond directly to a BIGINT data type or to database data types in general. FIG. 4 depicts a map-based encoding that may be used with a variety of database data types.

The API 104 may construct the name-value pair 408, 410 to represent the referenced value 404 in a map-based format. The name 408 may be set to a value that is indicative of the schema by which the map is encoded. The value 410 may be a map structure containing a collection of name-value pairs 412, 414 and 416, 418. As depicted in FIG. 4, the data type 406 of the referenced value may be encoded as a first name-value pair 412, 414, and the referenced value 404 may be encoded as a second name-value pair 416, 418.

For the encoding of the data type 406, the name 412 of the name-value pair 412, 414 may be set to indicate that the name-value pair 412 is indicative of a particular database data type. In this example, the database data type is "BIGINT" as indicated by the setting of value 414 of the name-value pair 412, 414.

For the encoding of the referenced value 404, the name 416 of the name-value pair 416, 418 may be set to indicate (e.g., with "value is") that the name-value pair 416, 418 represents the value of the referenced value 404, i.e. 12,000, 123,654. The value 418 of the name-value pair 416, 418 can be set by the API 104 to contain the actual value.

Figure 5:
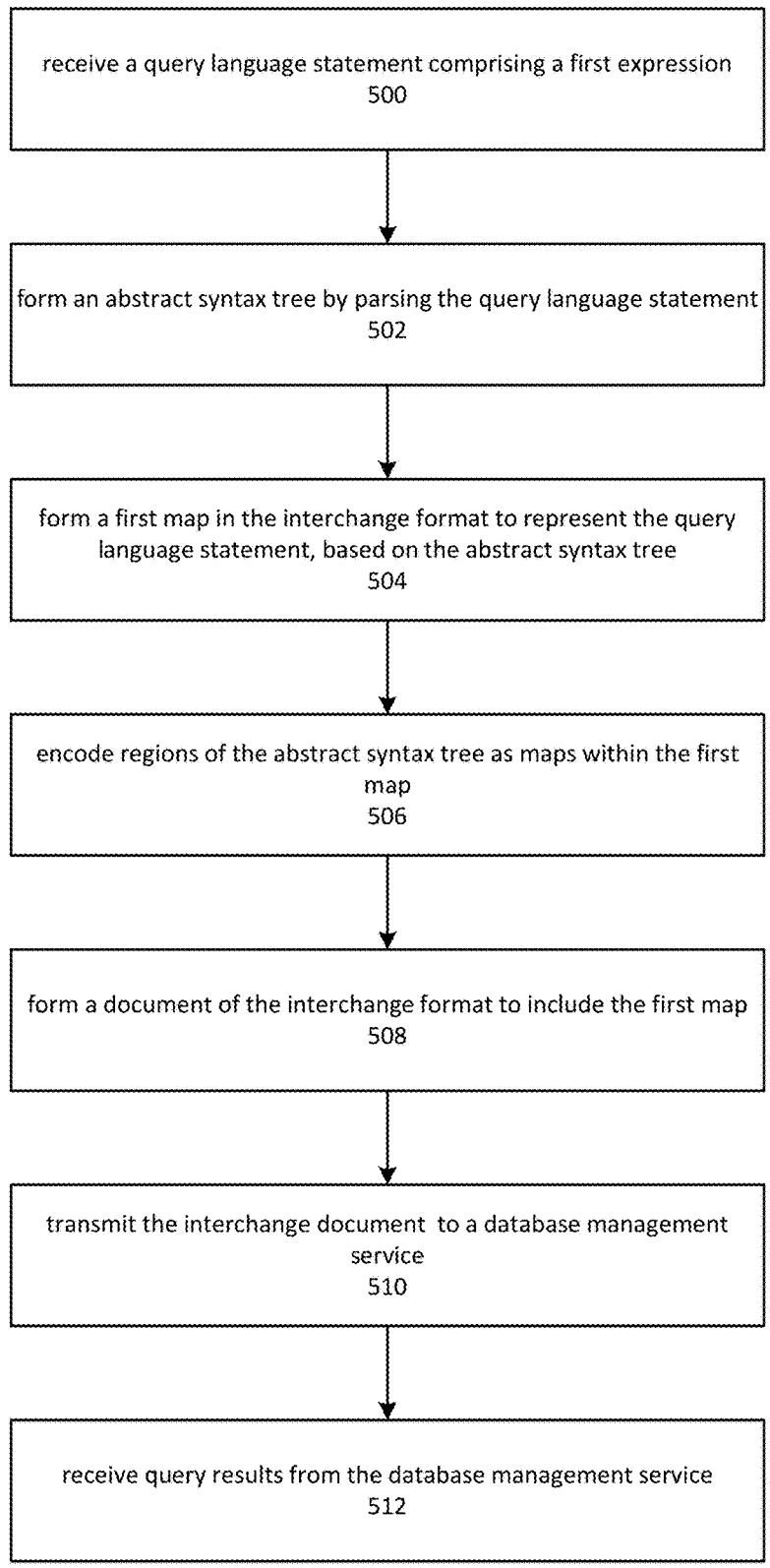
FIG. 5 is a flow diagram depicting transmitting a database query via a type-limited interchange format.

Aspects of the present disclosure may be better understood in view of FIG. 5, which is a flow diagram depicting transmitting a database query via a type-limited interchange format. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 500 depicts receiving a query language statement that comprises a first segment. The receiving may comprise a transfer of memory from a client application 102, as depicted in FIG. 1, to an API 104. Typically, the client application 102 may formulate a query language statement in a format compatible with that of the database that is to process the query.

Block 502 depicts the API 104 forming an abstract syntax tree. The API 104 may form the abstract syntax tree by parsing the query language statement. The abstract syntax tree may be used, as depicted by block 504, to form a first map in the interchange format that is representative of the query language statement. The first map may be constructed based at least in part on the abstract syntax tree, using the various techniques described herein. Block 504 may be performed in conjunction with block 506, which depicts encoding regions of the abstract syntax tree as additional maps within the first map. Nodes and regions of the abstract syntax tree may be converted to maps and included in a hierarchy of nested maps having the top-level first map at the hierarchy's root. The conversion may involve matching a region of the abstract syntax tree to a schema that defines map output, and then using the schema to produce the map that will be added to the hierarchy.

In some instances, the API 104 may perform character substitution when setting the value portion of a name-value pair, or when otherwise encoding a representation of the query into the interchange format. For example, when setting the value portion of a name-value pair, the API 104 might replace characters that are reserved in the data interchange format with some other value.

Block 508 depicts forming a document of the interchange format that includes the first map, and its various subcomponents. In other words, the document is formed by the API 104 to include the hierarchy of nested maps that represents the query language statement in the interchange format. Note that the term document may refer to a unit of data transmission in the interchange format. Although a document in the interchange format may be human readable, it is not necessarily a document in the traditional sense of being a word processing document, spreadsheet, and so forth.

As depicted by block 510, the document may be transmitted to a database service. For example, referring again to FIG. 1, the API 104 may transmit the document in interchange format 106 to a request router 108 that is a component of a database service. The request router 108 may translate the request back to a database protocol 110 that is compatible with the distributed database 112.

Next, as depicted by block 512, the distributed database 112 may process the version of the query language statement it has received from the request router 108, and return it to the API 104. The results of the query may also be received in the interchange format, which may then be translated by the API 104 and provided to the client application 102.

Figure 6:
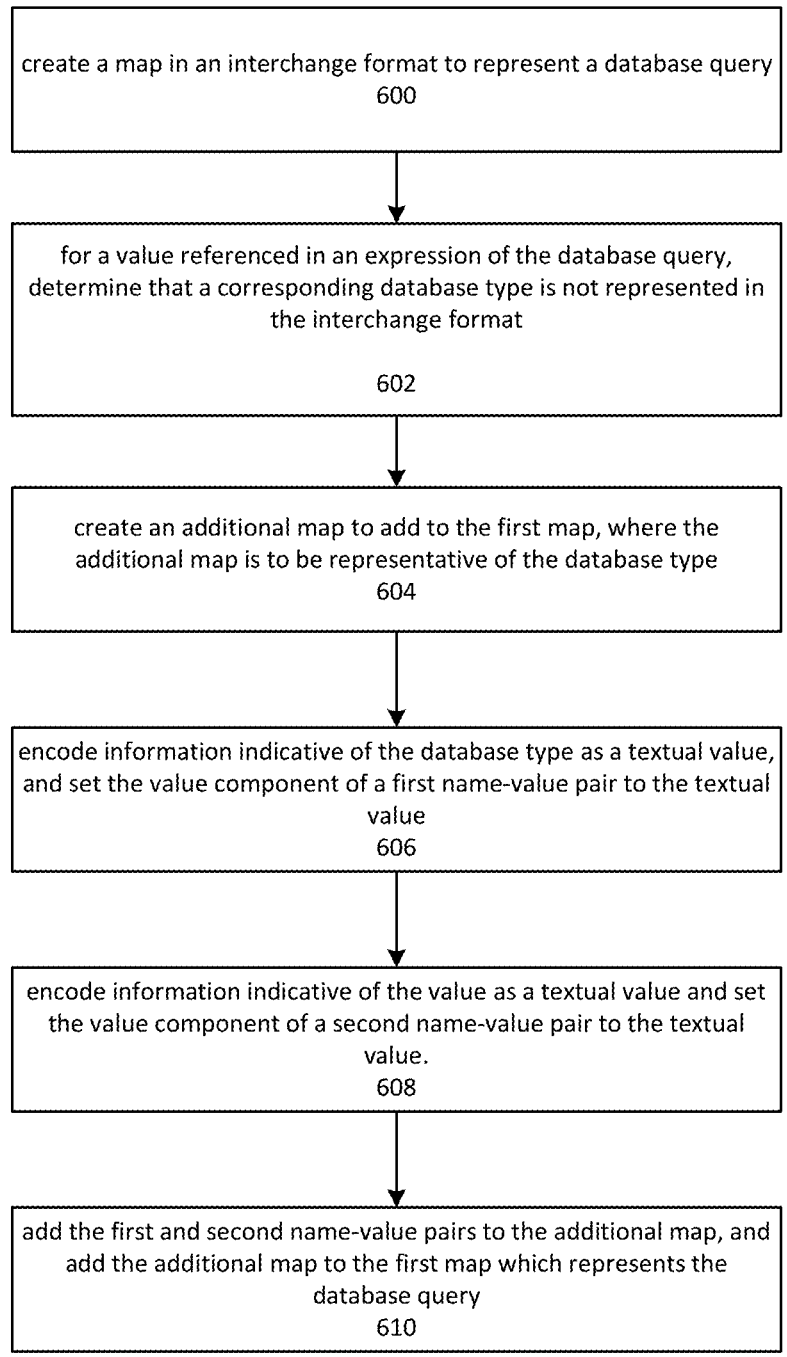
FIG. 6 is a flow diagram depicting a process for encoding a database data type in a type-limited interchange format.

Aspects of the present disclosure may be better understood in view of the following description of the use of a schema to encode database data types. FIG. 6 is a flow diagram depicting a process for encoding a database data type in a type-limited interchange format. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts the API 104 creating a map in an interchange format to represent a database query. The query may comprise various expressions containing explicit or implicit references to database types that are not represented by in the interchange format. Block 602 shows the API 104 determining that a referenced database type is not represented in the interchange format. This may, for example, involve identifying a value referenced in an expression of the query, determining a database data type corresponding to the value, and determining that the database data type is not one of the types natively supported by the interchange format. In other words, the API 104 might determine that the database data type is not one of a set of data types that the interchange format might inherently support. In some cases, the API 104 may presume that no database data types are inherently supported, and encode all references to values within a query as if there were no support for the corresponding database data type in the interchange format.

As depicted by block 604, the API 104 may create an additional map, to be added to the top-level map that represents the database query. The additional map may be formed to be representative of the referenced value and its corresponding database data type.

Block 606 depicts the API 104 encoding information indicative of the database data type as a first textual value, and setting the value component of a first name-value pair to the first textual value.

Block 608 depicts the API 104 encoding information indicative of the referenced value's value as a second textual value, and setting the value component of a second name-value pair to the second textual value.

As depicted by block 610, the first and second name-value pairs may be added to the additional map. The additional map may be added to the first map in the appropriate position. The structure of the first map, which represents the query, may in some instances approximate the structure of an abstract syntax tree formed by parsing the original query.

Figure 7:
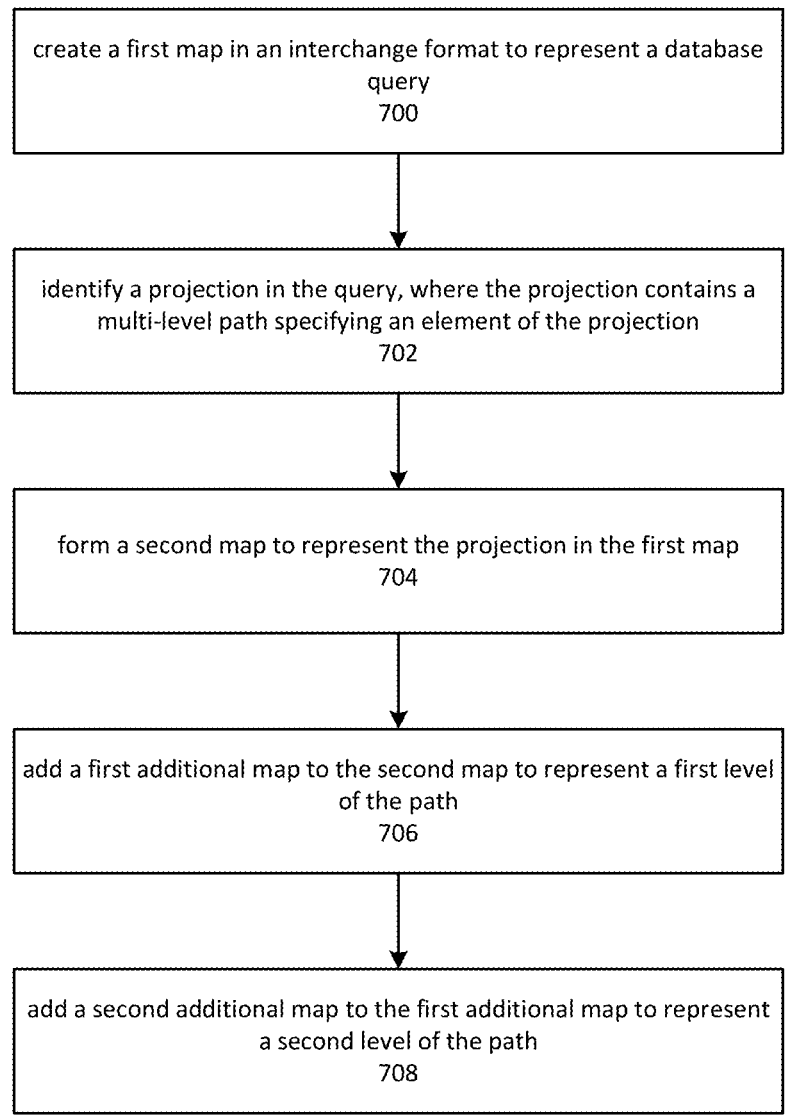
FIG. 7 is a flow diagram depicting translation of a projection specified in a query to a hierarchy of nested maps.

Aspects of the present disclosure may be better understood in view of the following example, which involves projections specified in a query that is to be transmitted in an interchange format from a client device to a database service. FIG. 7 is a flow diagram depicting translation of a projection specified in a query to a hierarchy of nested maps. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

A projection may refer to an element of a database query that describes how the results of a query are to be presented. For example, a projection might comprise a list of field names, such as "f1, f2, f5." A query using this projection could return data rows that comprised the three fields f1, f2, and f5.

Block 700 depicts creating a first map in an interchange format to represent a database query. The query may contain a projection. Block 702 depicts identifying a projection in the query. The fields of the projection may contain multi-level path identifiers. A path may be a concatenated sequence of identifiers, each of which may represent a step in locating a value. For example, in some instances a projection in a query might be specified as "A·B," indicating a first level of "A" and a second level of "B." The levels may refer to paths in an object, for example. In some instances, the object may be a JSON object. A path may, in such instances, refer to a location within a JSON object.

As depicted by block 704, the API 104 may form a second map that is to represent the projection within the first, top-level map. The levels of the path may be represented individually within the map. For example, as depicted by blocks 706 and 708, a first additional map may be added to represent the first level of the path indicator, and a second additional map may be added, as a child of the first additional map, to represent the second level of the path indicator.

Other types that may be encoded using one or more nested maps include lists, sets, binary values, null values, enumerations, and so on. Embodiments may maintain a dictionary of schemas by which the various types and expressions of the query language may be mapped to a schema. Examples of expressions which may be encoded include conditional expressions, such as "a<b," or assignment expressions such as "set a·c=2." The schema for the various types and expressions may be located in the dictionary by contextual analysis and other similar techniques for classifying regions of an abstract syntax tree. Embodiments may therefore select a schema by identifying a mapping between a region of an abstract syntax tree and a corresponding schema in the dictionary of schemas.

Figure 8:
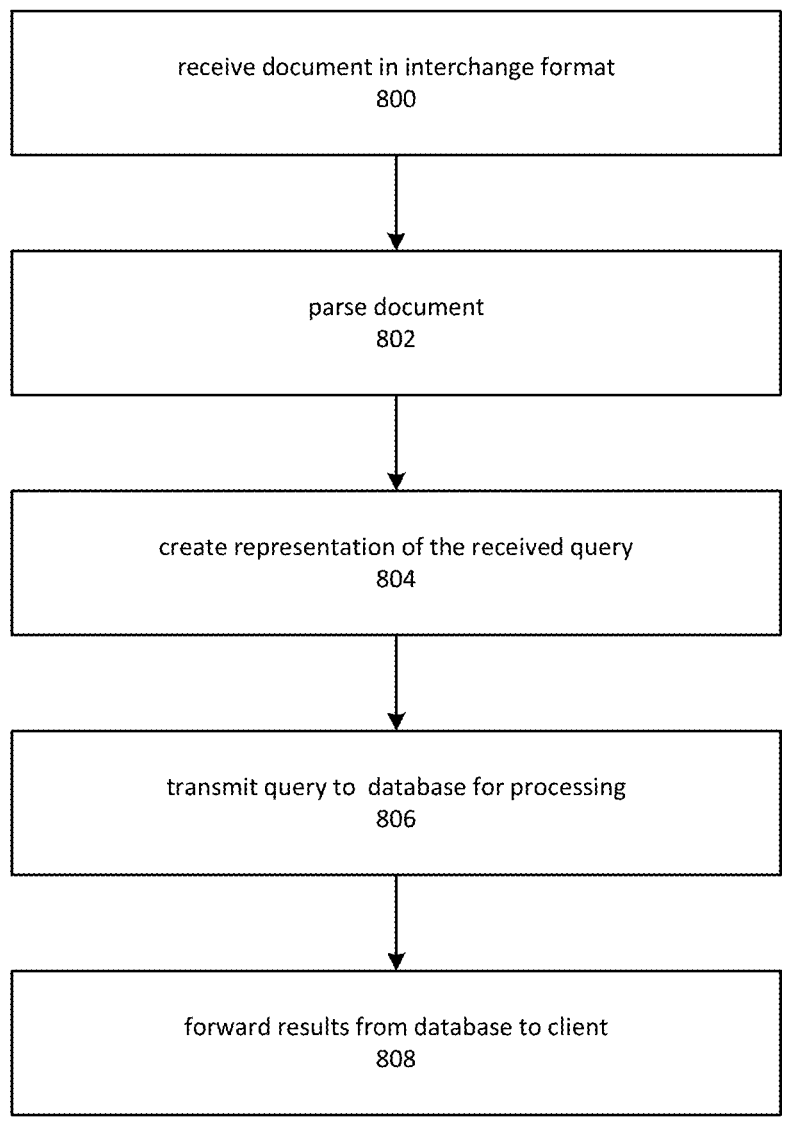
FIG. 8 is a flow diagram depicting processing of a query expressed in an interchange format.

FIG. 8 is a flow diagram depicting processing of a query expressed in an interchange format. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts receiving a document in the interchange format. As depicted in FIG. 1, the client device 100 may transmit a query in the interchange format 106 to the request router 108. The request router 108 may act as a front-end for processing the query. In some instances, the request router 108 may include a web server exposing a web services interface.

Block 802 depicts parsing the document. The request router 108 may parse the interchange format document and determine that it contains a query, encoded within a map as described herein. In some instances, the request router 108 may form an abstract syntax tree or other similar structure based on the interchange format document. The parsing operation may result in the formation, as depicted by block 804, of a representation of the received query. In some instances, a textual representation of the query might be formed, while in others the representation may be object-based. For example, in the former case the representation might be a SQL statement. In the latter case, a graph of programmatic objects might be formed.

Block 806 depicts transmitting the query to a database 112 for processing. A textual representation of the query might be transmitted to the database 112. If an object-based representation is used, the programmatic objects might be serialized to a binary form and transmitted to the database for processing.

The database 112 may then process the query and provide results. As depicted by block 808, the results of the query may be forwarded (or directly transmitted) to the client device that had issued the query in the interchange format.

Figure 9:
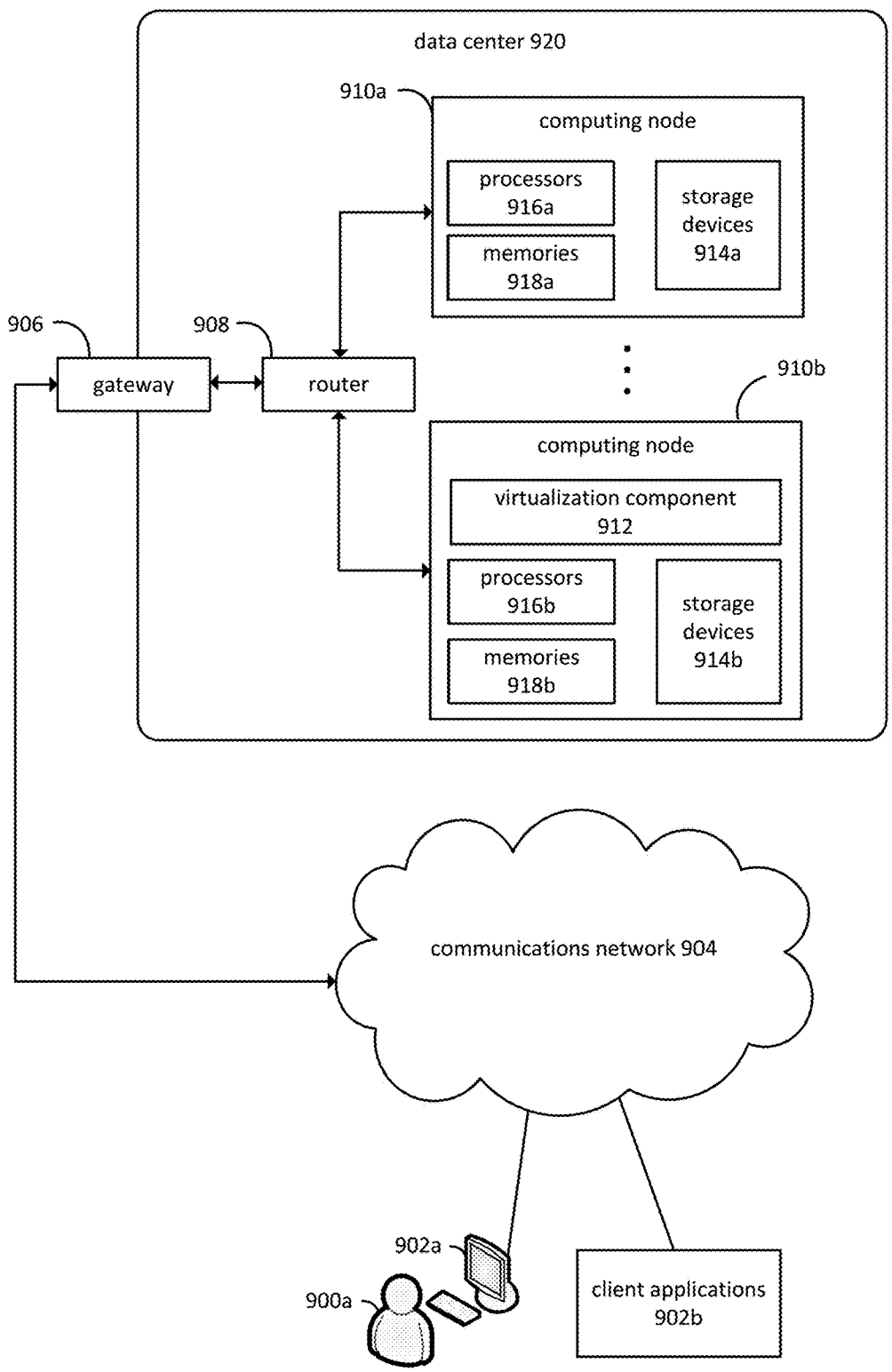
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900*a* may interact with various client applications, operating on any type of computing device 902*a*, to communicate over communications network 904 with processes executing on various computing nodes 910a and 910b within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a and 910b may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a and 910b. Some of these intermediate layers may themselves comprise processes executing on one or more of the computing nodes. Computing nodes 910a and 910b, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916a, one or more memories 918a, and one or more storage devices 914a. Processes on computing node 910a may execute in conjunction with an operating system or alternatively may execute as a bare-metal process that directly interacts with physical resources, such as processors 916a, memories 918a, or storage devices 914a.

Computing node 910b may comprise a virtualization component 912, which may include a virtual machine host and virtual machine instances to provide shared access to various physical resources, such as physical processors, memory, and storage devices. These resources may include the depicted processors 916b, memories 918b, and storage devices 914b. Any number of virtualization mechanisms might be employed to provide shared access to the physical resources.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented without the use of virtualization, computing nodes may include one or more memories configured to store computer-readable instructions and one or more processors configured to read and execute the instructions. A computing node may also comprise one or more storage devices, network interfaces, communications buses, user interface devices, and so forth. Computing nodes may also utilize virtualized computing resources, such as virtual machines implemented with or without a hypervisor, virtualized bare-metal environments, and so forth. A virtualization-based computing node therefore encompasses both the virtualization resources and the physical hardware needed to execute the virtualization resources. A computing node may be configured to execute an operating system and application programs. In some embodiments, a computing node might also comprise bare-metal application programs.

Figure 10:
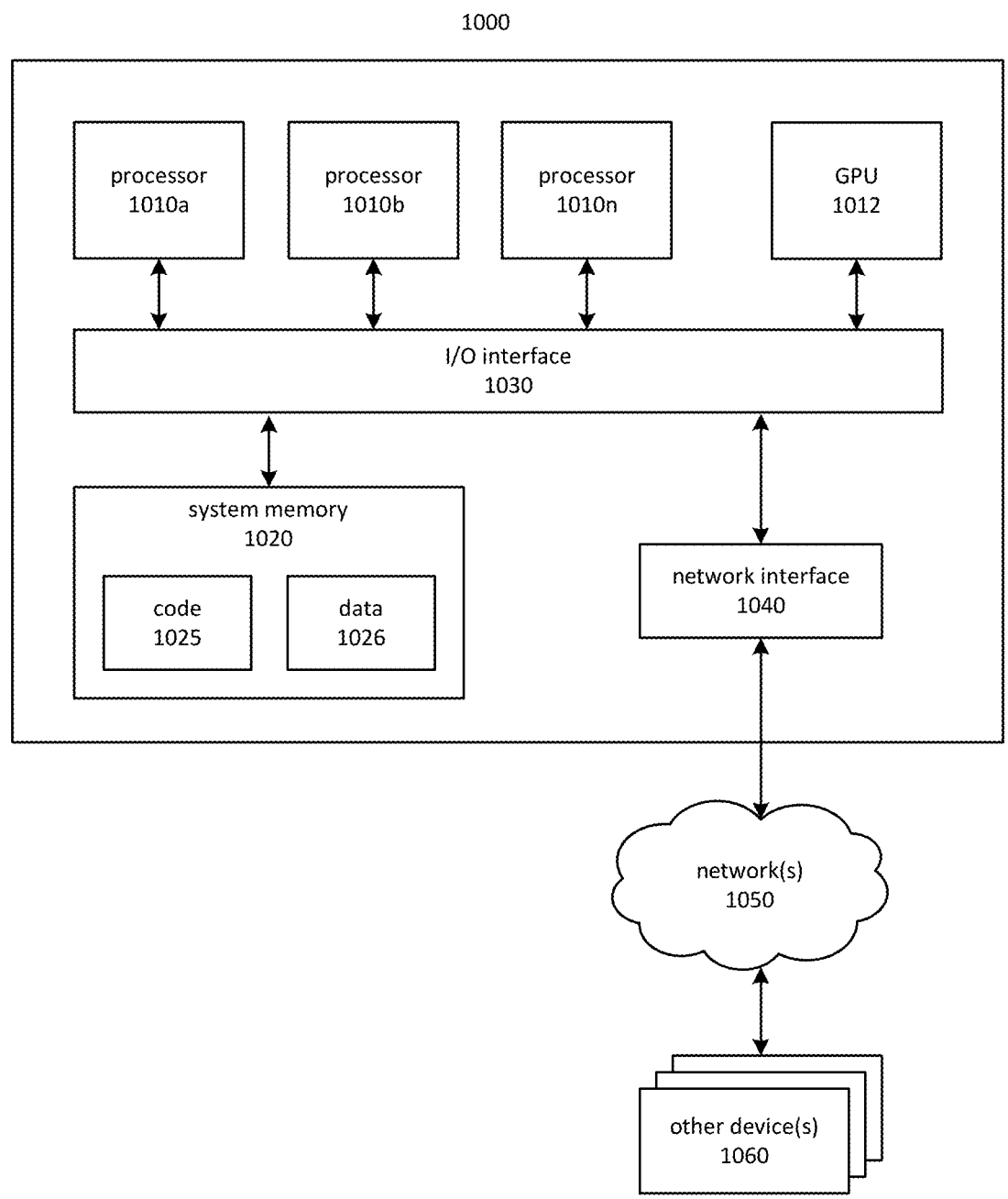
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device. In some instances, the GPU 1012 may perform calculations and execute instructions in cooperation with or in place of the processor 1010. Accordingly, as used herein, the term processor may encompass a GPU. Similarly, other highly parallelized processor architectures that supplement or replace the operation of the primary processor 1010 are also encompassed by the term processor.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example.

Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 1000 may be configured by software instructions to contain a module (not shown). A module is a component of the computing device 1000 that includes a set of instructions, loaded in whole or in part into system memory 1020, for performing a set of related functions, including input and output with other modules. The code 1025 and data 1026 of system memory 1020 are altered by the loading of the instructions. The operation of a module is effected by interchange between processor 1010, or in a multiprocessor system 1010a-1010n and/or GPU 1012, and the system memory 1020 via I/O interface 1030. A module may interact with other modules of the computing device 1000 via system memory 1020, and with other devices 1060 via network interface 1040 and network 1050.

A compute node, which may be referred to also as a computing node, may be implemented on a wide variety of computing environments, such as tablet computers, personal computers, smartphones, game consoles, commodity-hardware computers, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, instructions executed by one or more computers or computer processors. The instructions may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software instructions and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the instructions, systems, and data structures may also be stored (e.g., as software instructions or structured data) on a computer-readable medium, such as a hard disk, a memory, a network, or a portable media article to be read by an appropriate device or via an appropriate connection. The instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for interacting with a database service using a data interchange format lacking database type support, the system comprising:
   at least one processor; and
   a memory comprising processor-executable instructions that, in response to being executed by the at least one processor, cause the system to at least:
      form a query comprising a first expression;
      form an abstract syntax tree based at least in part on the query;
      identify a region of the abstract syntax tree corresponding to the first expression;
      form a first map in the data interchange format that is representative of the query, the first map comprising at least a second map, wherein the second map corresponds to the region of the abstract syntax tree that is representative of the first expression, the second map formed based at least in part on a schema associated with the identified region of the abstract syntax tree;
      transmit the first map to the database service; and
      receive, from the database service, information indicative of a result of processing the query.

2. The system of claim 1, the memory comprising further processor-executable instructions that, in response to being executed by the at least one processor, cause the system to at least:
   determine that a database type referenced in the first expression is not represented in the data interchange format;
   encode the database type as a first textual value in a first name-value pair of an additional map;
   encode a value corresponding to the database type as a second textual value in a second name-value pair of the additional map; and
   add the additional map to the second map.

3. The system of claim 2, the memory comprising further processor-executable instructions that, in response to being executed by the at least one processor, cause the system to at least:
   substitute a first character with a second character in a value portion of a name-value pair in response to the first character being reserved by the data interchange format.

4. The system of claim 1, the memory comprising further processor-executable instructions that, in response to being executed by the at least one processor, cause the system to at least:
   select the schema based at least in part on identifying a mapping between the region of the abstract syntax tree and the schema in a dictionary of schemas.

5. The system of claim 1, the memory comprising further processor-executable instructions that, in response to being executed by the at least one processor, cause the system to at least:
   identify a projection in the query comprising a path identifier, the path identifier indicative of a first hierarchy level and a second hierarchy level; and
   add an additional map to the first map, the additional map comprising a second additional map corresponding to the first hierarchy level, the second additional map comprising a third additional map corresponding to the second hierarchy level.

6. A method transmitting a database query using a data interchange format lacking database type support, the method comprising:
   forming an abstract syntax tree representative of a query;
   identifying one or more nodes of the abstract syntax tree that correspond to a first expression of the query;
   forming a representation of the query comprising a hierarchy of maps in the data interchange format, the hierarchy of maps comprising at least a first map representing the first expression, wherein the first map corresponds to the one or more nodes of the abstract syntax tree; and
   transmitting the hierarchy of maps to a database.

7. The method of claim 6, further comprising:
   forming the first map based at least in part on identifying a schema corresponding to the one or more nodes of the abstract syntax tree.

8. The method of claim 7, wherein the schema defines associations between attributes of the one or more nodes of the abstract syntax tree and name-value pairs in the first map.

9. The method of claim 6, further comprising:
   determining that a database type referenced in the first expression is not represented by the data interchange format;
   encoding the database type as a first textual value in a first name-value pair of an additional map;
   encoding a value corresponding to the database type as a second textual value in a second name-value pair of the additional map; and
   adding the additional map to the first map.

10. The method of claim 6, further comprising:
    substituting a first character with a second character in a textual representation of a value in response to the first character being reserved by the data interchange format.

11. The method of claim 6, further comprising:
    selecting a schema for the first map based at least in part on a classification of the first expression.

12. The method of claim 6, wherein the one or more nodes of the abstract syntax tree are mapped to one of a plurality of schemas for maps of the data interchange format.

13. The method of claim 6, further comprising:
    identifying a projection in the query comprising a path identifier, the path identifier indicative of a first level of a path and a second level of a path; and
    adding an additional map to the hierarchy of maps, the additional map comprising a second additional map corresponding to the first level, the second additional map comprising a third additional map corresponding to the second level.

14. A non-transitory computer-readable storage medium having stored thereon instructions that, upon execution by one or more computing devices, cause the one or more computing devices at least to:
    form an abstract syntax tree representative of a query to be processed by a database service;
    identify one or more nodes of the abstract syntax tree that correspond to a first expression of the query and are associated with a schema for generating a map in a data interchange format that does not have a native representation of database types;
    form a hierarchy of nested maps in the data interchange format, the hierarchy of nested maps comprising at least a first map, wherein the first map corresponds to one or more nodes of the abstract syntax tree and corresponds to the first expression;

form a document of the data interchange format, the document comprising the hierarchy of nested maps; and transmit the document to the database service, wherein the database service processes the query based on the document.

15. The non-transitory computer-readable storage medium of claim 14, wherein the schema comprises information indicative of an association between a property of the one or more nodes of the abstract syntax tree and a name-value pair in the first map.

16. The non-transitory computer-readable storage medium of claim 14, wherein the schema is indicative of a map-based representation of at least one of a database data type, a projection, a list, a set, a binary value, conditional expression, assignment expression or a null value.

17. The non-transitory computer-readable storage medium of claim 14, comprising further instructions that, upon execution by the one or more computing devices, cause the one or more computing devices to at least:

form an additional map representative of a value of a database data type comprising a first name-value pair indicative of the database data type and a second name-value pair indicative of the value of the database data type.

18. The non-transitory computer-readable storage medium of claim 14, comprising further instructions that, upon execution by the one or more computing devices, cause the one or more computing devices to at least:

substitute a first character with a second character in a textual representation of a value in response to the first character being reserved by the data interchange format.

19. The non-transitory computer-readable storage medium of claim 14, comprising further instructions that, upon execution by the one or more computing devices, cause the one or more computing devices to at least:

represent a projection in the query by adding an additional map to the hierarchy of nested maps, wherein the additional map comprises a second additional map corresponding to a first level of a path identifier of the projection and the second additional map comprises a third additional map corresponding to a second level of the path identifier of the projection.

20. The non-transitory computer-readable storage medium of claim 14, wherein the first expression is at least one of a conditional expression or an assignment expression and corresponds to a plurality of nodes of the abstract syntax tree.

* * * * *